United States Patent [19]
Smith

[11] 3,744,179
[45] July 10, 1973

[54] BAIT FISH RIGGING
[76] Inventor: William E. Smith, 219 E. Main, Monroe, Wash. 98272
[22] Filed: Feb. 22, 1971
[21] Appl. No.: 117,631

[52] U.S. Cl. .............................................. 43/44.4
[51] Int. Cl. ........................................... A01k 83/06
[58] Field of Search ................... 43/44.4, 44.2, 44.8

[56] References Cited
UNITED STATES PATENTS
| 3,624,950 | 12/1971 | Merckes | 43/44.2 |
| 1,114,698 | 10/1914 | Lane | 43/44.4 |
| 1,386,061 | 8/1921 | Johnson | 43/44.4 |
| 1,863,544 | 6/1932 | Prouse | 43/44.8 |
| 2,508,559 | 5/1950 | Worthington | 43/44.4 |

Primary Examiner—Antonio F. Guida
Assistant Examiner—Daniel J. Leach
Attorney—Christensen & Sanborn

[57] ABSTRACT

An apparatus for and method of rigging bait fish to maintain the mouth of the bait fish closed including a substantially circular member adapted to fit over the snout of the bait fish having at least one lateral run of a semi-rigid material comprising an anchor to hold the ring-like portion of the device in position. A second lateral run substantially perpendicular to the plane of said circular member may be provided if desired to engage and anchor the snout encircling portion of the device.

9 Claims, 8 Drawing Figures

PATENTED JUL 10 1973 3,744,179
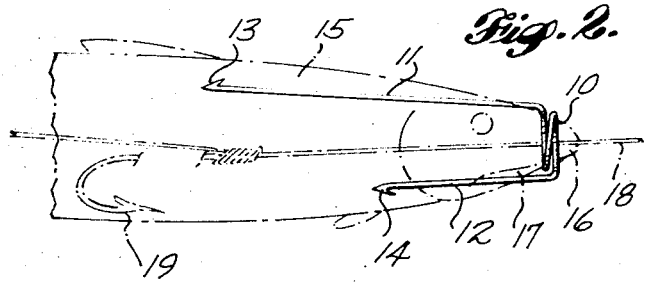
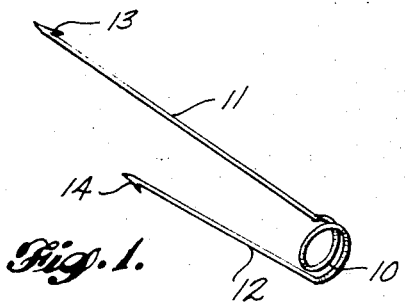
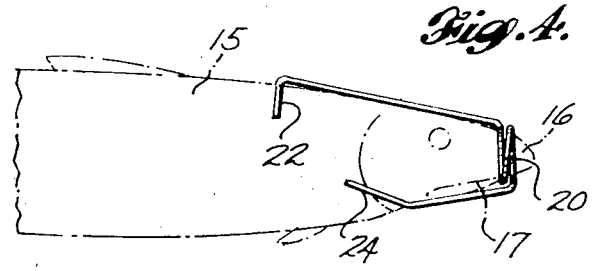
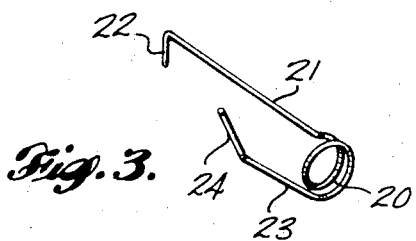
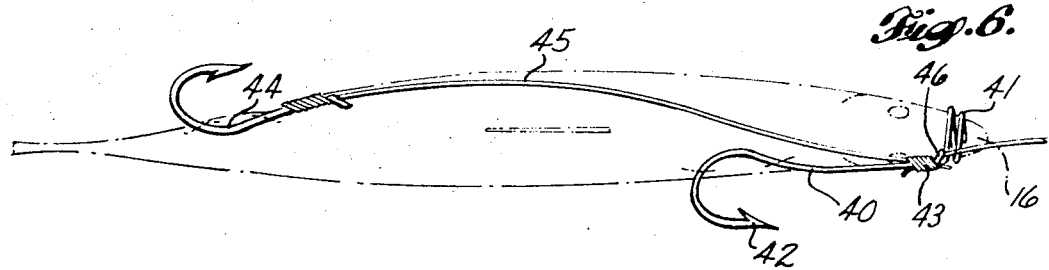
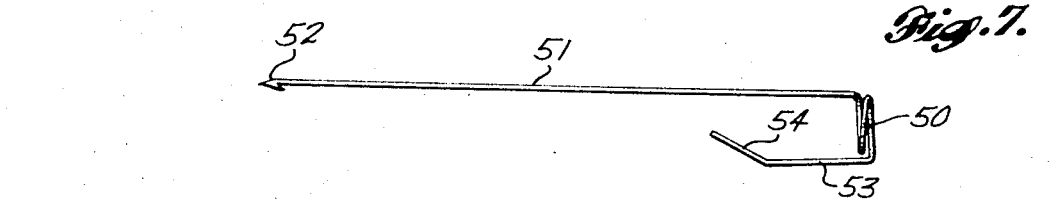
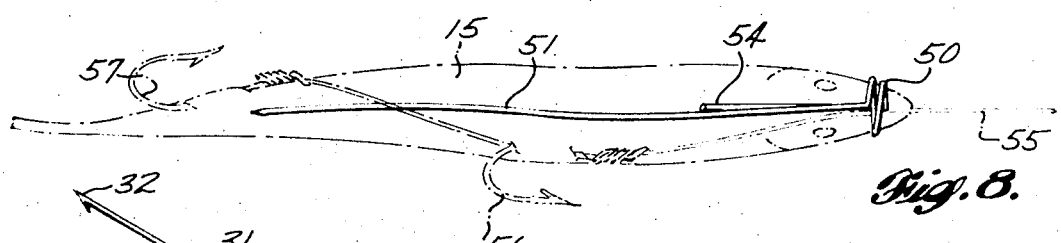
INVENTOR.
WILLIAM E. SMITH
BY Christensen, Sanborn
& Mathews
ATTORNEYS

BAIT FISH RIGGING

BACKGROUND OF THE INVENTION

This invention relates to apparatus for enchancing the lifelike characteristics of bait fish and, in particular, relates to an apparatus for and method of maintaining the mouth of the bait fish closed while trolling or mooching the bait.

This invention further relates to a method of and an apparatus for rigging a bait fish, such as herring, so that the mouth of the bait fish will be maintained in the closed position providing a more nearly lifelike and realistic appearing bait.

PRIOR ART

Many devices are known in the prior art to rig a bait fish, such as herring, candle fish and the like, for trolling and mooching for fish such as salmon, halibut, cod and other types of commercial and sport fishes. It is well known that a bait fish which is trolled with its mouth in the wide open position presents a less desirable type of bait and is frequently avoided by such wary fish as the various types of salmon. To alleviate this problem, methods of hooking the bait fish have been provided in the prior art in which a hook is inserted through the lower mandible of the bait fish with the point exiting through the upper skull of the fish. This maintains the mouth of the fish closed, however, it does not provide the desired action on the fish to simulate a wounded or otherwise desirable bait fish. Other types of rigging have been proposed in which the leader material is caused to pass about the snout of the bait fish ahead of the fish hook. However, such a rigging is time consuming and seldom results in the desired action and longevity of the bait on the hook.

OBJECTS OF THE INVENTION

It is therefore an object of this invention to provide an apparatus and method of using the apparatus which will maintain the mouth of the herring or other bait fish in the closed position, yet not interfere with the swimming action of the bait fish as it is trolled or mooched.

It is a further object of this invention to provide an apparatus which may easily be inserted into a portion of the bait fish with one segment of the device encircling the bait fish's snout so that the mouth of the bait fish is maintained in the closed position.

One specific object of this invention is to provide a fish hook having a snout encircling member to cause the mouth of the bait fish to remain closed.

These and other objects, attributes and advantages of this invention will become more readily apparent from a detailed evaluation of the attached drawings in conjunction with the following description. The drawings presented as a part hereof show various embodiments of this invention wherein:

FIG. 1 shows a perspective view of one embodiment of this invention having an upper and a lower lateral run attached to the snout encircling member;

FIG. 2 shows the apparatus of FIG. 1 in operative position engaging the snout of a herring;

FIG. 3 shows a second embodiment of this invention utilizing spring members as the lateral runs;

FIG. 4 shows the apparatus of FIG. 3 in operative position upon a herring;

FIG. 5 shows a third embodiment of this invention;

FIG. 6 shows a fourth embodiment of this invention wherein a fish hook having a snout encircling member is utilized;

FIG. 7 shows a fifth embodiment of this invention; and,

FIG. 8 shows the apparatus of FIG. 7 in operative position upon a herring.

Referring more particularly to the drawings, in FIG. 1 there is seen a first embodiment of this invention wherein a substantially circular snout engaging element 10 is shown having an upper elongated lateral run 11 and a lower later run 12. Lateral run 11 is equipped with a barbed end 13 and the lateral run 12 is similarly equipped with a barbed end 14. In FIG. 2 the apparatus of FIG. 1 is shown placed about the snout of a herring 15 with the snout encircling member 10 shown in position about the snout 16 maintaining the mouth 17 of the herring closed. A fish line 18 is shown having thereon at least one fish hook 19 shown in outline. With the device of this invention shown in its operative position in FIG. 2 the mouth of the herring is maintained in the closed position and it is dragged through the water in either the mooching or trolling modes of operation. The bait fish will remain in its desirable condition with the mouth closed so that a fish such as salmon or other commercial or game fish will not be dissuaded from attempting to swallow the herring for food.

In FIG. 3 a second embodiment of this invention is shown utilizing spring members to maintain the snout encircling member 20 in position. An upper spring member 21 having a downwardly depending leg 22 is shown attached to the snout encircling member 20. On the lower side of the snout encircling member 20 a lower lateral run 23 is shown with an upwardly projecting segment 24. In FIG. 4 the device of FIG. 3 is shown in its operative position around a herring 15. The snout encircling member 20 engages the snout 16 of the herring, maintaining the mouth 17 in its closed position. This embodiment of the device is attached to the herring by forcing the downwardly depending leg 22 and the upwardly projecting segment 24 into the flesh of the herring so that the device cannot be dislodged from the herring during normal fishing operations.

FIG. 5 shows a third embodiment of this invention in which a single lateral run is utilized to hold the apparatus in position. Here again, a snout encircling member 30 is shown with a lateral run 31 attached thereto. A barb 32 at the end of the lateral run 31 is utilized to help maintain the snout encircling member 30 in its operative position on the herring. In use, the device shown in FIG. 5 is placed upon a herring by forcing the lateral run 31 into the upper skull area of the herring and along its backbone until the snout encircling member 30 is positioned about the snout and mouth of the herring to maintain the mouth of the herring in the closed position.

FIG. 6 shows another embodiment of this invention in which a fish hook 40 has a snout encircling member 41 formed as a part of the shank of the fish hook 40. The hook is inserted into the side of the herring and the snout encircling member placed, as shown, around the snout of the herring by inserting the point 42 of fish hook 40 into the side of the herring and forcing the snout encircling member 41 over the snout 16 of the herring to maintain the mouth in the closed position. Fish hook 40 has an eye 46 through which fish line 45 passes. A knot 43 is shown encircling the shank of hook 40 and line 45 in either a solid-type tie arrangement or the well-known sliding-type hook-up widely used in the salmon sport fishing industry on the West Coast of the United States. This sliding-type of hook-up is so constructed that knot 43 tightly encircles both the shank of hook 40 and line 45 but permits relative movement of the hook 40 along line 45 such that the relative position of hook 44 and hook 40 may be adjusted to fit the size of the particular bait fish being utilized. The second hook 44 may be provided to hook into the herring at a rearward location with the fish line 45 exerting sufficient tension upon fish hook 44 to impart a twist to the back of the herring so that it will flash in the water as it is trolled or mooched.

In FIGS. 7 and 8 another embodiment of this invention is shown in which a snout encircling member 50 has attached thereto a long upper lateral run 51 with a barb 52 and a shorter lower lateral run 53 having an upwardly diverging segment 54. The device of FIG. 7 is shown in its operative position in FIG. 8 in which the long lateral run 51 has been inserted inside the herring 15 and has been twisted into a position other than straight so that the herring will assume a twist also. Fish line 55 in this embodiment is fed through the snout encircling loop 50 and is attached to fish hooks 56 and 57 in a manner well known in the art. By inserting the line 55 through the snout encircling member 50 as shown in FIG. 8, the apparatus shown in FIG. 7 will not be lost when the herring is stripped from the hook by a game fish.

The apparatus of this invention is advantageously constructed of stainless steel or similar metallic or plastic material which will not be corroded by exposure to salt water. The apparatus of this invention is readily adapted to various sizes of fish by providing several different snout encircling element diameters so that large or small bait fish may be used.

Many minor changes and modifications to this invention will become apparent to one skilled in the art upon contemplating the basic invention disclosed herein. For example, the snout encircling member need not necessarily be circular; other geometric forms may be used. Indeed, an oval shape may be advantageous to fit the snout of particular types of bait fish more perfectly and, of course, square or triangular members could also be used. Such modifications are intended to be within the scope and spirit of this invention.

I claim as my invention:

1. Apparatus to aid in rigging bait fish comprising:
   a snout encircling member of a size to permit insertion of the snout of a bait fish therein while maintaining the mouth of said bait fish in the closed position, and
   at least one elongated anchor member attached to said snout encircling member extending substantially perpendicular thereto and adapted to penetrate a portion of said bait fish and anchor said snout encircling member in position.

2. The apparatus of claim 1 wherein said anchor member has at least one barb thereon.

3. The apparatus of claim 1 wherein said anchor member has a portion thereof angled with respect to the main portion of said anchor member, said angle portion constructed and arranged to be forced into the flesh of said bait fish to securely fasten said snout encircling member in its operative position.

4. The apparatus of claim 1 having a pair of anchor members extending from said snout encircling member.

5. The apparatus of claim 1 wherein said anchor member is formed into a fish hook.

6. The apparatus of claim 1 wherein said snout encircling member is substantially circular.

7. The apparatus of claim 1 and fish hook and line means engaging said apparatus.

8. The apparatus of claim 5 and fish line attached thereto.

9. The apparatus of claim 5 and a second fish hook, said second fish hook firmly attached to a fish line, said fish line passing through the aperture of said snout encircling member.

* * * * *